(12) United States Patent
Zhao et al.

(10) Patent No.: US 11,203,693 B2
(45) Date of Patent: Dec. 21, 2021

(54) METHOD OF COATING AN ARTICLE, PASTE AND PLUG FOR PREVENTING HOLE BLOCKAGE DURING COATING

(71) Applicant: General Electric Company, Schenectady, NY (US)

(72) Inventors: Jianzhi Zhao, Shanghai (CN); Zhida Pan, Shanghai (CN); Cem Murat Eminoglu, Greenville, SC (US); Canan Uslu Hardwicke, Greenville, SC (US); Liming Zhang, Greenville, SC (US); Lei Cao, Shanghai (CN); Wenqing Peng, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 219 days.

(21) Appl. No.: 16/326,721

(22) PCT Filed: Sep. 15, 2017

(86) PCT No.: PCT/US2017/051726
§ 371 (c)(1),
(2) Date: Feb. 20, 2019

(87) PCT Pub. No.: WO2018/057414
PCT Pub. Date: Mar. 29, 2018

(65) Prior Publication Data
US 2020/0010944 A1 Jan. 9, 2020

(30) Foreign Application Priority Data

Sep. 23, 2016 (CN) .................. 201610846983.X (51) Int. Cl.
*C09D 1/00* (2006.01)
*C23C 4/134* (2016.01)
(Continued)

(52) U.S. Cl.
CPC .............. *C09D 1/00* (2013.01); *B05C 21/005* (2013.01); *B05D 1/08* (2013.01); *B05D 3/002* (2013.01);
(Continued)

(58) Field of Classification Search
CPC ........ B05C 21/005; B05D 1/08; B05D 3/002; B05D 3/007; C04B 2111/00663;
(Continued)

(56) References Cited

U.S. PATENT DOCUMENTS 4,262,043 A 4/1981 Wald
4,743,462 A 5/1988 Radzavich et al.
(Continued)

FOREIGN PATENT DOCUMENTS

CN 104496425 A 4/2015
EP 2662469 A2 11/2013
(Continued)

OTHER PUBLICATIONS

Hoebel et al., "Automated Laser Re-Opening of Film Cooling Holes", ASME Turbo Expo 2006: Power for Land, Sea, and Air, Manufacturing Materials and Metallurgy, Paper No. GT2006-90896, vol. 4, pp. 991-1000, Conference Location: Barcelona, Spain, May 8-11, 2006.

(Continued)

*Primary Examiner* — James M Mellott
(74) *Attorney, Agent, or Firm* — McNees Wallace & Nurick, LLC (57) ABSTRACT

A method includes masking at least one hole of an article with a paste, wherein the hole opens onto a surface of the article, applying a coating to the surface of the article, and removing the paste including contacting the paste with water, leaving at least one open hole in the surface of the coated article. The paste includes about 40-80 wt % of a (Continued)

filler material, about 0.5-20 wt % of an inorganic binder, about 0.5-15 wt % of a polyhydroxy compound and about 5-25 wt % of water. The filler material includes a first material which includes alkali metal doped alumina, zirconium oxide, titanium oxide, silicon dioxide, or a combination thereof and a second material which includes a silicate. A weight ratio between the first and second materials is in a range of about 1-10.

14 Claims, 4 Drawing Sheets

(51) Int. Cl.

| | |
|---|---|
| *C23C 4/01* | (2016.01) |
| *F01D 5/28* | (2006.01) |
| *C04B 24/10* | (2006.01) |
| *C04B 28/26* | (2006.01) |
| *C04B 28/34* | (2006.01) |
| *B05C 21/00* | (2006.01) |
| *B05D 1/08* | (2006.01) |
| *B05D 3/00* | (2006.01) |
| *F01D 5/18* | (2006.01) |
| *C04B 111/00* | (2006.01) |

(52) U.S. Cl.
CPC ............ *B05D 3/007* (2013.01); *C04B 24/10* (2013.01); *C04B 28/26* (2013.01); *C04B 28/342* (2013.01); *C23C 4/01* (2016.01); *C23C 4/134* (2016.01); *F01D 5/28* (2013.01); *F01D 5/288* (2013.01); *C04B 2111/00663* (2013.01); *F01D 5/186* (2013.01); *F05D 2220/323* (2013.01); *F05D 2230/90* (2013.01); *F05D 2240/24* (2013.01); *Y02T 50/60* (2013.01)

(58) Field of Classification Search
CPC ....... C04B 24/10; C04B 28/26; C04B 28/342; C09D 1/00; C23C 4/01; C23C 4/134; F01D 5/186; F01D 5/28; F01D 5/288; F05D 2220/323; F05D 2230/90; F05D 2240/24; Y02T 50/60
See application file for complete search history.

(56) References Cited

U.S. PATENT DOCUMENTS

| | | | |
|---|---|---|---|
| 6,024,787 A * | 2/2000 | Lee .................... | B22C 1/185 |
| | | | 106/38.2 |
| 7,083,824 B2 | 8/2006 | Stankowski et al. | |
| 7,147,899 B2 | 12/2006 | Fernihough et al. | |
| 8,021,719 B2 | 9/2011 | Graichen | |
| 9,206,499 B2 | 12/2015 | Zimmerman | |
| 2005/0100672 A1* | 5/2005 | Stankowski ........... | F01D 5/28 |
| | | | 427/282 |
| 2006/0066013 A1* | 3/2006 | Amritphale ......... | C04B 33/1352 |
| | | | 264/669 |
| 2013/0302522 A1* | 11/2013 | Eminoglu ............. | F01D 5/286 |
| | | | 427/259 |
| 2015/0037498 A1* | 2/2015 | Bruck .................. | B22F 10/40 |
| | | | 427/229 |
| 2016/0160337 A1 | 6/2016 | Eminoglu | |

FOREIGN PATENT DOCUMENTS

| | | |
|---|---|---|
| EP | 2881489 A1 | 6/2015 |
| EP | 3156513 A1 | 4/2017 |

OTHER PUBLICATIONS

Summerside et al., "Advanced Reconditioning Technologies for Turbine Blading at Alstom", ASME Turbo Expo 2008: Power for Land, Sea, and Air, Manufacturing, Materials and Metallurgy, Paper No. GT2008-50583, vol. 1, pp. 437-447, Conference Location: Berlin, Germany, Jun. 9-13, 2008.
International Search Report and Written Opinion issued in connection with corresponding PCT application No. PCT/US2017/051726 dated Dec. 12, 2017.
JP Office Action, JP Application No. 2019-513322, dated May 27, 2020.
English Translation of JP Office Action.
China National Intellectual Property Administration Notice on the First Office Action for related Chinese application 201610846983. X, dated Apr. 19, 2019.
China National Intellectual Property Administration Notice on the Second Office Action for related Chinese application 201610846983. X, dated Oct. 12, 2019.

* cited by examiner

METHOD OF COATING AN ARTICLE, PASTE AND PLUG FOR PREVENTING HOLE BLOCKAGE DURING COATING

FIELD OF THE INVENTION

The present invention relates generally to a method of coating an article with at least one hole, a paste and a plug used for preventing hole blockage during coating an article with at least one hole.

BACKGROUND OF THE INVENTION

Articles such as engine components used on aircraft or for power generation are typically run at a very high temperature. Since high temperatures may damage alloys used for the components, a variety of approaches have been used to raise the operating temperature of the components. One approach calls for the incorporation of internal cooling holes in the component, through which cool air is forced during engine operation. The cooling holes may be formed in the substrate of the component by specialized laser-drilling techniques. Cooling air (usually provided by the engine's compressor) is fed through the holes from the cooler side to the hot side of the combustor wall. As long as the holes remain clear, the rushing air will assist in lowering the temperature of the hot metal surface and preventing melting or other degradation of the component. Another approach for protecting the component from the high temperature involves the use of a thermal barrier coating (TBC). Sometimes the use of TBC in conjunction with the cooling holes is the most effective means for protecting an engine part.

However, incorporation of both TBC and cooling holes is very difficult. For example, the cooling holes sometimes cannot be formed in the engine part after a TBC has been applied, since lasers usually cannot effectively penetrate both the ceramic material and the metal to form the pattern of holes. If the cooling holes are formed prior to the application of the TBC system, they may become covered and at least partially obstructed when the TBC is applied. Complete removal of the TBC material from the holes may be very time-consuming and ineffective, if not impossible. Any obstruction of the holes during engine operation may interfere with the passage of cooling air, may waste compressor power, and may possibly lead to of engine component damage due to overheating.

Therefore, methods of coating an article with holes that do not suffer from the above drawbacks are desirable.

SUMMARY OF THE INVENTION

A method includes: masking at least one hole of an article with a paste, wherein the hole opens onto a surface of the article; applying at least one coating to the surface of the article; and removing the paste including contacting the paste with water, leaving at least one open hole in the surface of the coated article. The paste includes from about 40 weight percent to about 80 weight percent of a high temperature resistant filler material, from about 0.5 weight percent to about 20 weight percent of an inorganic binder, from about 0.5 weight percent to about 15 weight percent of a polyhydroxy compound, and from about 5 weight percent to about 25 weight percent of water. The high temperature resistant filler material includes a first material and a second material. The first material includes alkali metal doped alumina, zirconium oxide, titanium oxide, silicon dioxide, or a combination thereof. The second material includes a silicate. A weight ratio between the first material and the second material is in a range from about 1 to about 10.

A paste for masking a hole opening onto a surface of an article when a coating is applied to the surface of the article, includes from about 40 weight percent to about 80 weight percent of a high temperature resistant filler material, from about 0.5 weight percent to about 20 weight percent of an inorganic binder, from about 0.5 weight percent to about 15 weight percent of a polyhydroxy compound, and from about 5 weight percent to about 25 weight percent of water. The high temperature resistant filler material includes a first material and a second material. The first material includes alkali metal doped alumina, zirconium oxide, titanium oxide, silicon dioxide, or a combination thereof. The second material includes a silicate. A weight ratio between the first material and the second material is in a range from about 1 to about 10.

A method for forming a plug which is used to mask a hole opening onto a surface of an article when a coating is applied to the surface of the article, includes forming a plug preform from a paste, the plug preform shaped in conformity with the hole; and drying the plug preform. The paste includes from about 40 weight percent to about 80 weight percent of a high temperature resistant filler material, from about 0.5 weight percent to about 20 weight percent of an inorganic binder, from about 0.5 weight percent to about 15 weight percent of a polyhydroxy compound, and from about 5 weight percent to about 25 weight percent of water. The high temperature resistant filler material includes a first material and a second material. The first material includes alkali metal doped alumina, zirconium oxide, titanium oxide, silicon dioxide, or a combination thereof. The second material includes a silicate. A weight ratio between the first material and the second material is in a range from about 1 to about 10.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Unless defined otherwise, technical and scientific terms used herein have the same meaning as is commonly understood by one of skill in the art to which this invention belongs. The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. Additionally, when using an expression of "about a first value–a second value," the about is intended to modify both values. In at least some instances, the approximating language may correspond to the precision of an instrument for measuring the value. Here, and throughout the specification and claims, range limitations may be combined and/or interchanged, such ranges are identified and include all the sub-ranges contained therein unless context or language indicates otherwise.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Embodiments of the present disclosure relate to a paste used to mask at least one hole in an article when applying a coating to the article, a water-soluble or water-dispersible hole plug made from the paste by drying and/or sintering the paste, an article having at least one hole thereof masked with the paste, and a method for coating an article with at least one hole, during which the at least one hole are masked with the paste or the plug to prevent hole blockage. As used herein, "mask" or "masked" means to close off the surface of the hole by partially or completely filling the hole with the paste or plug. The term "water-soluble" means the paste or plug can be dissolved in water or a water containing liquid, the term "water-dispersible" means the paste or plug can be dispersed by contacting water. Thus removal of the water-soluble or water-dispersible paste or plug may be facilitated by contacting the paste or plug with water, for example, by directly contacting water itself, or contacting a water containing liquid, or water containing environment (such as moisture environment). As such, the paste or plug may be directly dissolved by water, or may be dispersed by water and then easily be broken and taken away from the hole. In some embodiments, the "water containing liquid" or "water containing environment" contains at least 10 weight percent of water, or particularly at least 20 weight percent of water. During the process of coating, the paste which may be dried prior to or during the process of coating, or the plug can resist against coating environment and prevent hole blockage. After coating, the dry paste or plug can be easily removed due to its water solubility or dispersibility.

The paste may include a high temperature resistant filler material for withstanding the applied coating when a coating is applied to the article and an inorganic binder for binding together particles of the high temperature resistant filler material to increase the viscosity of the paste and/or increase the strength of the dry paste or the plug made from the paste.

The high temperature resistant filler material may provide a sufficient structural strength for supporting the applied coating and have a high temperature resistance for withstanding the high temperatures necessary for the application of the one or more coatings. As used herein the "high temperature resistant filler material" refers to a material that generally withstands temperatures greater than about 315° C. (about 600° F.), for example, temperatures generally in the range of about 315° C. (about 600° F.) to about 982° C. (about 1800° F.). In some embodiments, the high temperature resistant filler material can withstand temperatures greater than about 400° C. (about 752° F.) for at least 1 or 2 hours. In some specific embodiments, the high temperature resistant filler material can withstand temperatures in the range of about 700° C. (about 1292° F.) to about 1200° C. (about 2190° F.) for at least 1 or 2 hours. The high temperature resistant filler material has appropriate particle sizes to ensure both structural strength and water dispersibility of the dry paste or plug. In some embodiments, the high temperature resistant filler material has an average particle size in a range from about 0.1 micron to about 100 microns.

A weight percentage of the high temperature resistant filler material relative to the paste may be in a range from about 40 weight percent to about 80 weight percent. In some embodiments, the range is from about 60 weight percent to about 80 weight percent. In some embodiments, the high temperature resistant filler material includes a first material and a second material mixed at a certain ratio to ensure an appropriate combination of structural strength and water dispersibility. The first material may include alkali metal doped alumina, zirconium oxide, titanium oxide, silicon dioxide, or a combination thereof. The second material may include a silicate. The alkali metal doped alumina may be sodium or potassium doped alumina, such as beta-alumina and boehmite. The zirconium oxide, titanium oxide or silicon dioxide may be doped or undoped, depending on specific needs. In some embodiments, the first material includes beta-alumina, boehmite, or a combination thereof. In some embodiments, the first material includes zirconium oxide, titanium oxide, silicon dioxide, or a combination thereof. In some embodiments, the second material comprises zirconium silicate. A weight ratio between the first material and the second material may be in a range from about 1 to about 10. In some embodiments, the range is from about 1 to about 8. In some embodiments, the range is from about 1 to about 6.

The inorganic binder may be able to withstand the high temperature necessary for the application of the one or more coatings, or may be thermally decomposable under the high temperature during the application of the one or more coatings, to produce at least one product that can withstand said high temperatures (the thermal stability). In some embodiments, the inorganic binder is water soluble, or at least one of the thermal decomposition products of the inorganic binder is water soluble if the inorganic binder is thermally decomposable during the coating processing (the water solubility). The inorganic binder may be any kind of inorganics that can increase the viscosity of the paste and/or increase the strength of the dry paste or plug, and also have the thermal stability and water solubility as described herein above. The inorganic binder may be alkaline, to make the paste be alkaline, for example, to make the paste have a PH greater than 7.5, in order to increase the strength of the dry paste or plug. In some embodiments, the inorganic binder includes a phosphate, a hydrogen phosphate, a pyrophosphate, a carbonate, a bicarbonate, a chloride, a hydroxide, or any combinations thereof. In some specific embodiments, the inorganic binder includes a phosphate, a hydrogen phosphate, a pyrophosphate, a carbonate, a bicarbonate, a chloride, or a hydroxide of an alkali metal, or any combinations thereof. In some specific embodiments, the inorganic binder includes sodium phosphate, potassium phosphate, sodium hydrogen phosphate, potassium hydrogen phosphate, sodium pyrophosphate, potassium pyrophosphate, sodium carbonate, potassium carbonate, sodium bicarbonate, potassium bicarbonate, sodium chloride, potassium chloride, sodium hydroxide, potassium hydroxide, or any combinations thereof. A weight percentage of the inorganic binder relative to the paste may be in a range from about 0.5 weight percent to about 20 weight percent. In some embodiments, the range is from about 10 weight percent to about 20 weight percent.

The paste may further include a polyhydroxy compound. The polyhydroxy compound may function as an organic binder for further increasing the viscosity of the paste. The polyhydroxy compound may be burned off under the high temperature during the coating processing, and thereby provide microporous structures in the dry paste or plug to improve the water dispersibility of the dry paste or plug. A weight percentage of the polyhydroxy compound relative to the paste may be in a range from about 0.5 weight percent to about 15 weight percent. In some embodiments, the range is from about 1 weight percent to about 5 weight percent. In some embodiments, the polyhydroxy compound includes sugar. Examples of the sugar include, but are not limited to sucrose, fructose and glucose.

The paste may further include water. A weight percentage of water relative to the paste may be in a range from about 5 weight percent to about 25 weight percent. In some embodiments, the range is from about 10 weight percent to about 15 weight percent.

During a process of applying a coating such as a thermal barrier coating (TBC) layer to an article with holes, the paste as described above may be applied manually or dispensed with a syringe operated by a robot to mask the holes. The paste, once dried prior to or during the process of applying the coating, forms plug-in pins in the holes to support the coating and prevent the holes from being blocked by the coating material. Once the coating is applied, the holes can be easily reopened by exposing the dried paste in the holes, for example, by polishing the coated surface of the article, and soaking the article in water or a water containing liquid, or by placing the article in water containing environment for a period (such as, for at least 1 hour or 2 hours), because the dried paste can be dissolved or dispersed in the water or water containing liquid/environment and the dispersed paste can be removed conveniently.

In some embodiments, the paste may be pre-cured and molded to form dry plugs with configuration fit for the holes in the article. In use, these plugs can be directly inserted into the holes in the article to achieve the hole masking. As such, the curing or molding of the paste can be separated and independent from the process of applying the coating.

In some embodiments, the plugs are obtained by shaping the paste and drying the shaped paste in a certain temperature (for example, a temperature in a range from about 50° C. to about 300° C.). The drying removes the water in the paste as much as possible and makes the obtained plugs have an appropriate strength. The obtained plugs may have a composition similar to the dried paste. In some embodiments, the plug includes from about 50 weight percent to about 90 weight percent of a high temperature resistant filler material, from about 0.5 weight percent to about 25 weight percent of an inorganic binder, and from about 0.5 weight percent to about 20 weight percent of a polyhydroxy compound, wherein the high temperature resistant filler material, the inorganic binder and the polyhydroxy compound may be similar to or the same with those described herein above. More specifically, the weight percentage of the high temperature resistant filler material relative to the plug may be in a range from about 70 weight percent to about 90 weight percent in some embodiments. In some embodiments, the weight percentage of the inorganic binder relative to the plug may be in a range from about 5 weight percent to about 15 weight percent. In some embodiments, the weight percentage of the polyhydroxy compound to the plug is in a range from about 1 weight percent to about 5 weight percent. In some embodiments, the plug may include a small amount of residual water that is not removed during the drying.

In some embodiments, the plugs are obtained by shaping the paste, drying the shaped paste and then sintering the shaped paste, wherein the water in the paste is basically removed during the drying, and the polyhydroxy compound may be burned off and the inorganic binder may be thermally decomposed to produce other materials during the sintering. In some embodiments, a pug is obtained by forming a plug preform from the paste wherein the plug preform is shaped in conformity with the hole in the article; drying the plug preform; and sintering the dried plug preform. Considering that shrinkage may occur during the drying and sintering, the plug preform may be sized slightly bigger than the hole in the article, in order to make the plug obtained after the drying and sintering have a size fit for the hole in the article. The plug preform may be dried at a temperature in a range from about 25° C. to about 300° C., or preferably from about 50° C. to about 300° C., or more preferably from about 100° C. to about 200° C. The drying may be carried out by heating the plug preform, for example, with a furnace, a heat gun, or infrared light. The water in the paste may be gradually removed during the drying. The sintering may be carried out at a temperature in a range from about 400° C. to about 1000° C., or preferably from about 700° C. to about 800° C. The sintering may include causing the polyhydroxy compound in the paste to be partially or completely burned off (converting the polyhydroxy compound into gases that can escape from the paste), and thereby cause formation of a micro-pore structure in the plug. Therefore, the plug may include a micropore structure formed due to the burning out of the polyhydroxy compound in the paste.

The paste or plug described herein above is applicable in either coating a newly manufactured article or re-coating a used article with an original coating thereof scraped off. The article as described herein may be used in any applications that undergo temperature changes, such as, but not limited to, power generation systems which include, but are not limited to, gas turbines, steam turbines, jet turbines, and other turbine assemblies. Some examples of the articles, include but are not limited to, turbine blades, nozzles, vanes, shrouds, buckets, transition pieces and liners used in power generation systems.

Figure 1:
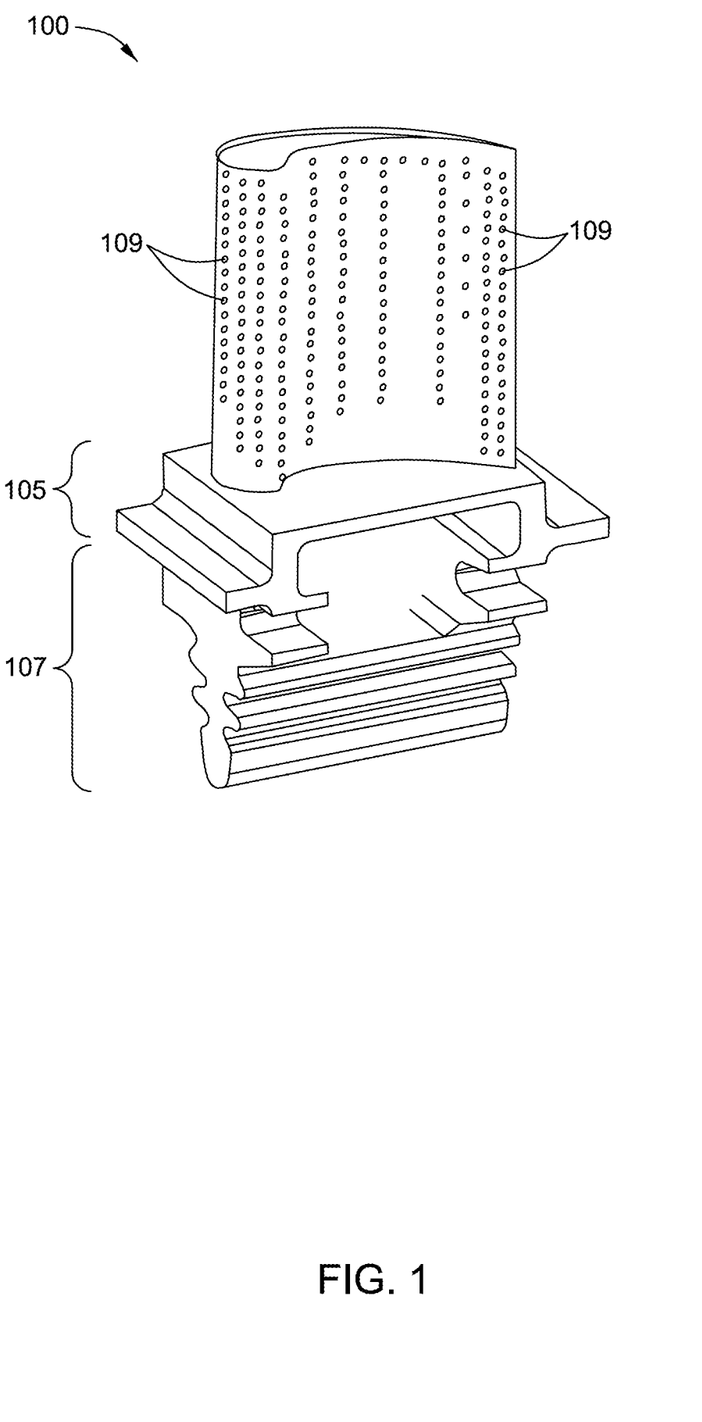
FIG. 1 is a perspective view of an article having a plurality of holes formed therein, in accordance with one embodiment of the present disclosure.

For example, FIG. 1 shows a turbine blade 100 that can be used with the method described herein. The turbine blade 100 has three sections: an airfoil section 103, a platform section 105, and a dovetail section 107. Airfoil section 103 includes a plurality of cooling holes 109 which permit cooling air to exhaust from an interior space of turbine blade 100. Turbine blade 100 is typically fabricated from a high temperature oxidation and corrosion resistant alloy with high temperature strength, such as a nickel-based superalloy. An exterior surface of airfoil section 103 of the turbine blade 100 may be coated with any coating system known in the art for coating on a turbine blade 100 opposed to combustion gases. A known coating system includes a bond coat on the surface of the turbine blade 100, typically comprising an aluminide or MCrAlY (where M is Ni, Co, and/or Fe) and a TBC layer disposed on the bond coating, which may include ceramic materials, such as yttria stabilized zirconia.

The TBC layer is typically applied by a process, such as air plasma spray or electron beam physical vapor deposition, that provides the surface with a coating morphology suitable for providing airfoil section 103 surface with resistance to heat. The combination of the bond coating and TBC layer provide airfoil section 103 with long-term resistance to heat and corrosion resulting from contact with the combustion gas stream.

Figure 2:
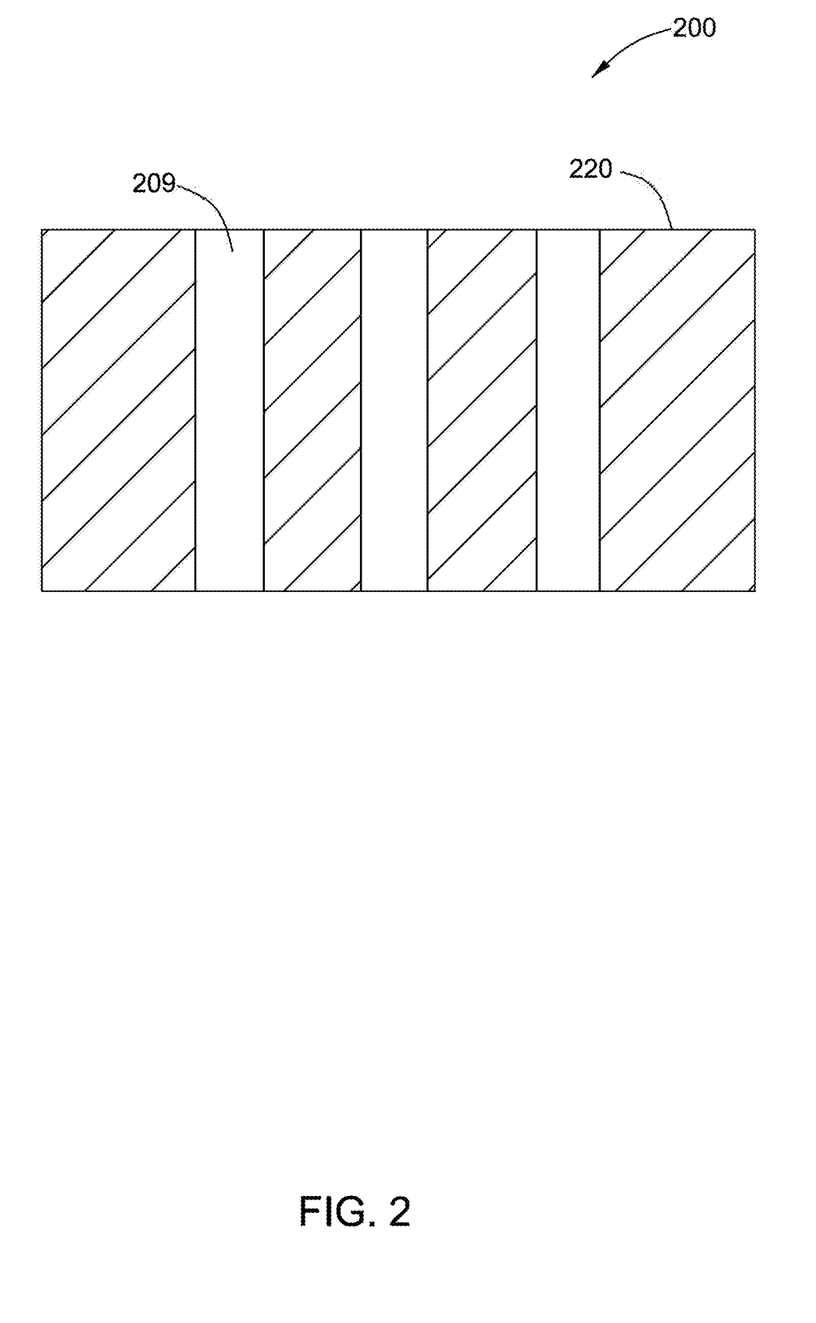
FIG. 2 illustrates a status of an article before holes within the article are masked, in accordance with one embodiment of the present disclosure.
Figure 3:
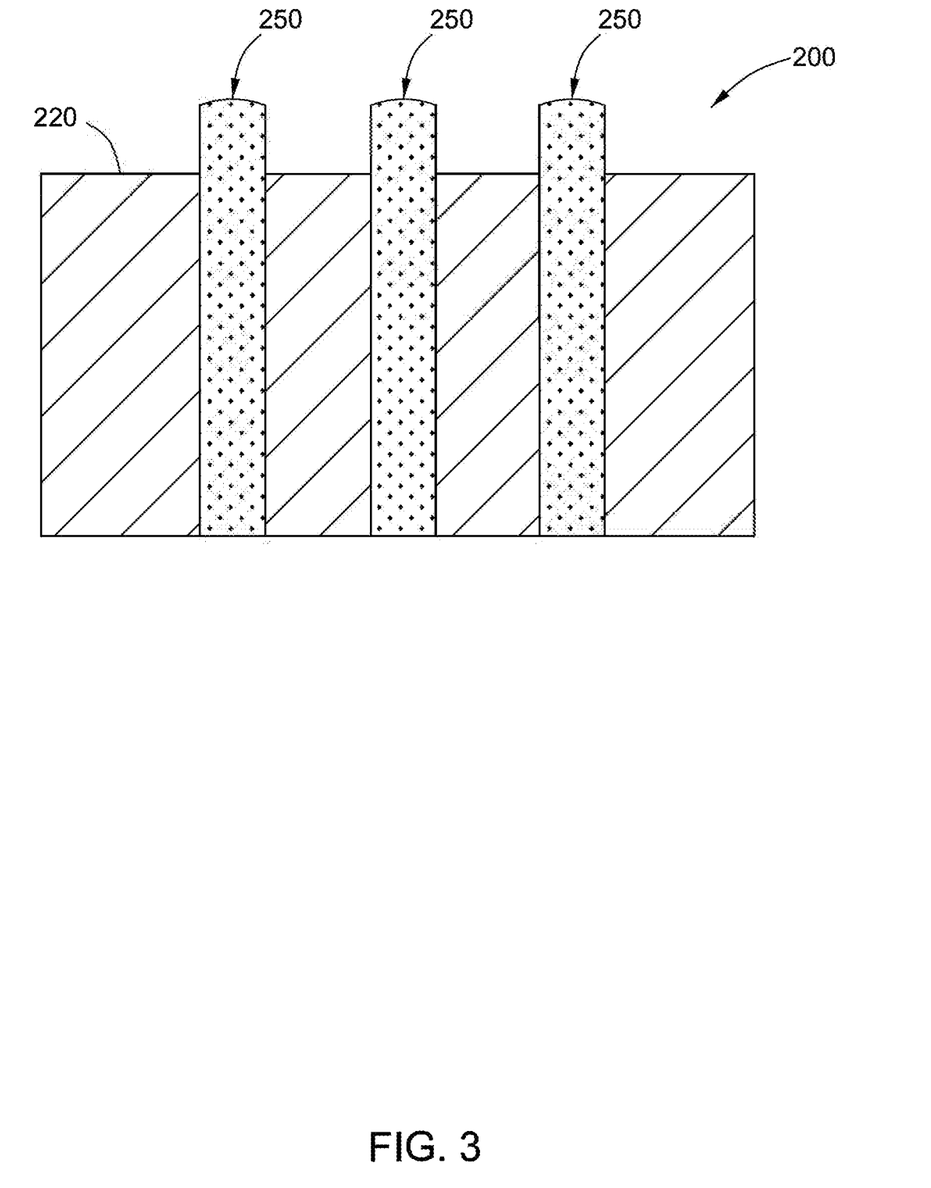
FIG. 3 illustrates a status of the article of FIG. 2 when the holes within the article are filled and thereby masked with a paste or plugs.
Figure 4:
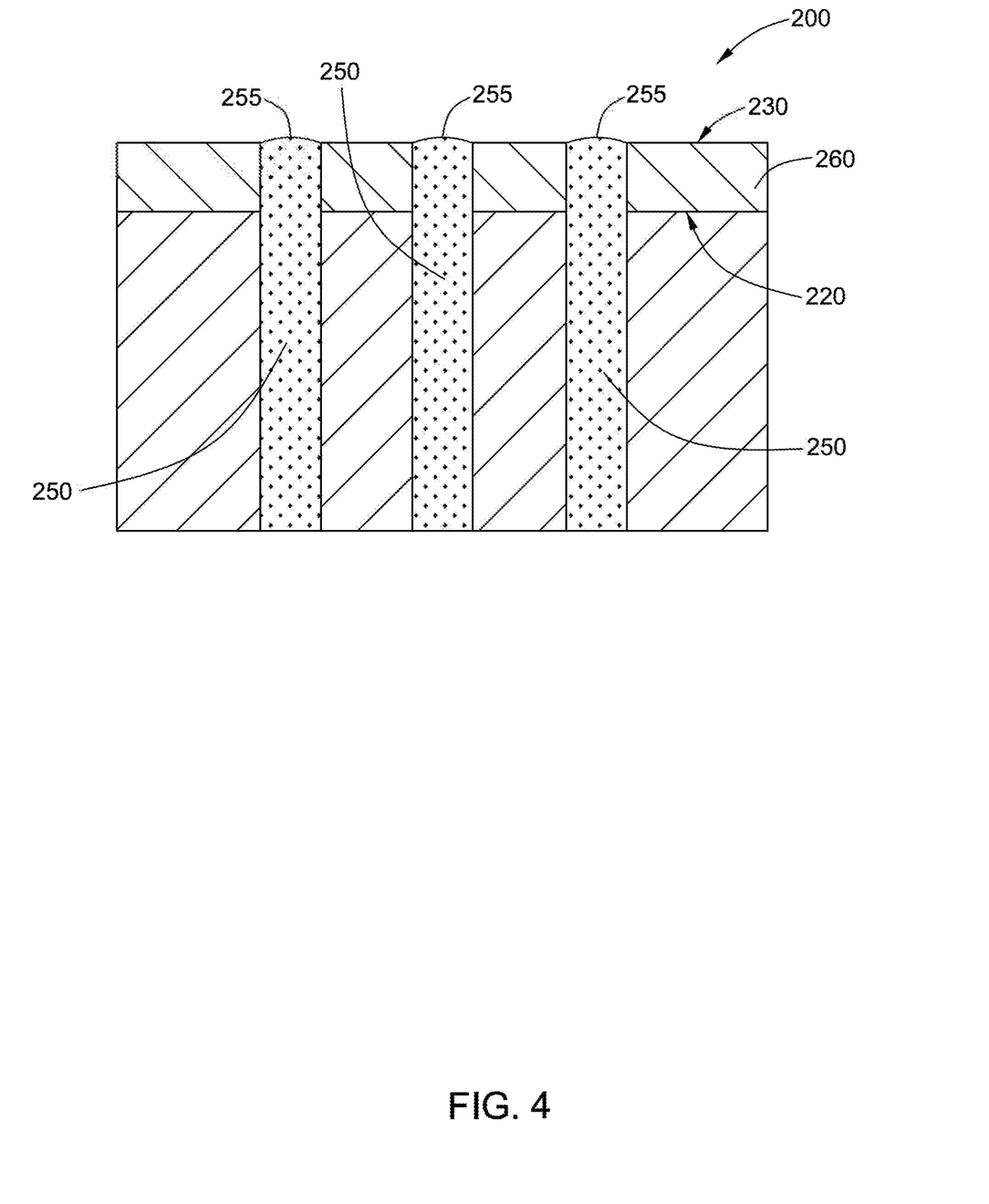
FIG. 4 illustrates a status of the article of FIG. 2 when the article is applied with a coating.

It should be noted that the turbine blade 100 of FIG. 1 is merely illustrative and is non-limiting. The paste may be used on any suitable article which has a surface and at least one hole that opens onto the surface, such as an article 200 as shown in FIGS. 2-4. FIGS. 2-4 illustrate a cross sectional view of the article 200, in which the inside of holes 209 within the article are shown. Three different statuses of the article 200 are illustrated in FIGS. 2-4, respectively, wherein FIG. 2 illustrates a status before the holes 209 are masked, FIG. 3 illustrates a status when the holes 209 are filled and thereby masked with a paste or plugs as described herein above, and FIG. 4 illustrates a status when the article 200 is applied with a coating.

Referring to FIGS. 3 and 4, the holes 209 are filled, or at least partially filled with a paste or plugs 250. The paste or plugs 250 may be substantially even with an external surface 220 of article 200 or situated slightly above the external surface 200. Therefore, when a coating 260 is applied to the external surface 220, the coating material can be prevented from entering the holes 209. In some embodiments, the paste or plugs 250 have a portion of an arch shape 255 above an external surface 230 of the coated article. The arch shaped portion 255 above the external surface 230 makes the coating material probably applied over the hole become easier to be detected and removed. Moreover, the arch shaped portion 255 does not shadow the coating material from being applied to the other areas during coating. The coating 260 is applied at elevated temperatures, generally greater than about 400° C., and in some particular embodiments, greater than about 700° C. The paste or plugs 250 withstand the high temperatures necessary for application of coatings. During application of the coating 260, organics of the paste or plugs 250 may be "burned" off depending on the temperature that surface 220 reaches during coating processing. Most organics can be burned off in a temperature range from about 300° C. to about 800° C. Examples of organics that are burned off include carbon containing materials, and materials containing sulfur that may be present in the paste.

After coating 260 is applied, the article 200 is cooled. Then the dry paste or plugs 250 can be easily removed by immersing the coated article 200 in a bath of water. The water bath causes at least one composition of the dry paste or plug 250 to dissolve in the water to disperse and remove the dry paste or plug 250 and frees the holes 209, leaving the article 200 having coating 260 thereon and holes 209 free from any coating or other materials, without having to engage in hand drilling to clear holes 209. To aid the dry paste or plug removal process, an external force such as mechanical (e.g. pressurized water) or acoustical vibration (e.g. ultrasonics) may be employed in the water bath. For example, the dissolution and/or dispersion may be accelerated by using pressurized water to flush through the cooling holes in some embodiments. After removing the dry paste or plugs from the holes, final heat treatment may be applied to the article to cure the applied coating.

The dry paste or plug which is made from the paste including a first and second high temperature resistant filler material mixed at a certain ratio has an appropriate combination of strength and water dispersibility, and thus can withstand the applied coating when a coating is applied to the article and can be easily removed in water after the coating is applied.

Moreover, as the masked holes can be opened by dissolving or dispersing the paste or plug material in the holes, substantially without use of mechanical force which may cause deformation of the holes or damage of the coating, the holes can substantially maintain an original shape and a cross-sectional dimension thereof through the applying of the coating and removing of the paste or plug material. As used herein, "substantially maintain a cross-sectional dimension" means that, as for a hole has an initial cross sectional area, the "open hole" (the hole after removal of the paste or plug material) has a cross sectional area at least 95% of the initial cross-sectional area, or preferably at least 98% of the initial cross-sectional area.

The following examples are intended to further illustrate embodiments of the present disclosure. They are not intended to limit the present disclosure in any way.

Example 1

Zirconia based pastes were prepared by mixing zirconia ($ZrO_2$), zircon ($ZrSiO_4$), potassium hydrogen phosphate ($K_2HPO_4$), sucrose and distilled water. Paste samples with different $ZrO_2$:$ZrSiO_4$ weight ratios were prepared. Specifically, paste samples of different compositions set forth in the following Table 1 were prepared and applied by a substantially same process. The preparation and application of these paste samples will be described hereinafter by taking Sample 1 as an example. As for Sample 1, 0.5 g of sucrose and 2 g of potassium hydrogen phosphate were dissolved in 2 g of distilled water to form a solution. Then 8 g of zirconia powder with a particle size of about 0.1 micron and 4 g of zircon powder with a particle size of about 1 micron were added into the solution. The mixture was mixed by a SpeedMixer (from FlackTek Inc., SC, USA) with a rotating speed of about 3000 rpm. After about 5 minutes of mixing, a homogeneous paste/slurry was obtained. Pastes of other compositions were obtained by similar processes.

During the application, the as-prepared slurry-like paste was introduced into cooling holes by syringe so as to mask the holes opening onto a surface of a specific article. Then the paste was dried at about 60° C. for about 8 hours, followed by thermal treatment at about 200° C. for about 1 hour. Thus dry plugs were formed in the holes and provided with enough mechanical strength for the following coating process. An Air Plasma Spray (APS) process was used to apply a thermal barrier coating (TBC) to surface of the article at a temperature of about 760° C. Next, the article was dipped into a bath containing warm water in order to disperse the plug, leaving the article having the TBC and open holes. The plugs were softened and became mushy within one hour or less, and finally were dispersed in different degree. The strength and water dispersibility of the plugs made from different zirconia based paste compositions are listed in the following Table 1.

TABLE 1

Zirconia based paste compositions and plug performance

| Samples | Paste compositions | | | | | Plug performance |
|---|---|---|---|---|---|---|
| | $ZrO_2$ | $ZrSiO_4$ | $K_2HPO_4$ | sucrose | water | |
| S1 | 8 g | 0 g | 3 g | 0.8 g | 4 g | poor strength |
| S2 | 8 g | 0.5 g | 3 g | 0.8 g | 4 g | poor strength |
| S3 | 8 g | 1 g | 3 g | 0.8 g | 4 g | weak strength & good dispersibility |
| S4 | 8 g | 1.5 g | 3 g | 0.8 g | 4 g | good strength & good dispersibility |
| S5 | 8 g | 4 g | 2 g | 0.5 g | 2 g | good strength & good dispersibility |

TABLE 1-continued

Zirconia based paste compositions and plug performance

| Samples | Paste compositions | | | | | Plug performance |
|---|---|---|---|---|---|---|
| | $ZrO_2$ | $ZrSiO_4$ | $K_2HPO_4$ | sucrose | water | |
| S6 | 8 g | 7 g | 3 g | 0.8 g | 4 g | good strength & weak dispersibility |
| S7 | 8 g | 9 g | 3 g | 0.8 g | 4 g | poor dispersibility |

As illustrated in Table 1, when the $ZrO_2$:$ZrSiO_4$ weight ratio is in a range from about 1 to about 8, the plugs have an appropriate combination of strength and dispersibility. Specifically, when the $ZrO_2$:$ZrSiO_4$ weight ratio is in a range from 2 to 6, the plugs have both good strength and water dispersibility.

Example 2

Beta-alumina based pastes were prepared by mixing beta-alumina ($\beta$-$Al_2O_3$), $ZrSiO_4$, $K_2HPO_4$, sucrose and distilled water. Paste samples with different $\beta$-$Al_2O_3$:$ZrSiO_4$ ratios were prepared. Specifically, paste samples of different compositions set forth in the following Table 2 were prepared and applied by a process substantially the same with the process for preparing and applying the zirconia based paste as described herein above in Example 1. The strength and water dispersibility of the plugs made from different beta-alumina based paste compositions are listed in the following Table 2.

TABLE 2

Beta-alumina based paste compositions and plug performance

| Samples | Paste compositions | | | | | Plug performance |
|---|---|---|---|---|---|---|
| | $\beta$-$Al_2O_3$ | $ZrSiO_4$ | $K_2HPO_4$ | sucrose | water | |
| S1 | 8 g | 0 g | 3 g | 0.8 g | 4 g | poor strength |
| S2 | 8 g | 0.5 g | 3 g | 0.8 g | 4 g | poor strength |
| S3 | 8 g | 1 g | 3 g | 0.8 g | 4 g | weak strength & good dispersibility |
| S4 | 8 g | 2.5 g | 3 g | 0.8 g | 4 g | good strength & good dispersibility |
| S5 | 8 g | 5 g | 3 g | 0.8 g | 4 g | good strength & medium dispersibility |
| S6 | 8 g | 9 g | 3 g | 0.8 g | 4 g | poor dispersibility |

As illustrated in Table 2, when the $\beta$-$Al_2O_3$:$ZrSiO_4$ weight ratio is in a range from about 1 to about 8, the plugs have an appropriate combination of strength and water dispersibility. Specifically, when the $\beta$-$Al_2O_3$:$ZrSiO_4$ weight ratio is around 3, the plugs have both good strength and good water dispersibility.

Example 3

Potassium phosphate ($K_3PO_4$) and potassium carbonate ($K_2CO_3$) were respectively used as the inorganic binder to prepare pastes. Two paste samples were prepared by using $K_3PO_4$ and $K_2CO_3$ as the inorganic binder, respectively, and then applied to plug holes, by a process substantially the same with the process in Example 1. The compositions of the two paste samples, and the strength and water dispersibility of plugs made from these two paste samples are set forth in the following Table 3.

TABLE 3

Paste compositions using $K_3PO_4$ or $K_2CO_3$ as the inorganic binder and plug performance

| Samples | Paste compositions | | | | | Plug performance |
|---|---|---|---|---|---|---|
| S1 | $ZrO_2$ 8 g | $ZrSiO_4$ 4 g | $K_3PO_4$ 2 g | sucrose 0.5 g | water 2 g | good strength & good dispersibility |
| S2 | $ZrO_2$ 8 g | $ZrSiO_4$ 4 g | $K_2CO_3$ 1.8 g | sucrose 0.5 g | water 2 g | good strength & good dispersibility |

As illustrated in Table 3, the plugs made from the pastes respectively using $K_3PO_4$ and $K_2CO_3$ as the inorganic binder have good strength and good water dispersibility.

Example 4

Potassium chloride (KCl) and a mixture of KCl and potassium hydroxide (KOH) were respectively used as the inorganic binder to prepare pastes. Two paste samples were prepared by using KCl and a mixture of KCl and KOH (PH is about 11) as the inorganic binder, respectively, and then applied to plug holes, by a process substantially the same with the process in Example 1. The compositions of the two paste samples, and the strength and water dispersibility of plugs made from these two paste samples are set forth in the following Table 4.

TABLE 4

Paste compositions using KCl or a mixture of KCl and KOH as the inorganic binder and plug performance

| Samples | Paste compositions | | | | | | Plug performance |
|---|---|---|---|---|---|---|---|
| | $ZrO_2$ | $ZrSiO_4$ | KCl | KOH | sucrose | water | |
| S1 | 8 g | 4 g | 1 g | 0 g | 0.5 g | 2 g | weak strength & good dispersibility |
| S2 | 8 g | 4 g | 1 g | 0.14 g | 0.5 g | 2 g | good strength & good dispersibility |

As illustrated in Table 4, the plugs made from the pastes respectively using KCl and the mixture of KCl and KOH as the inorganic binder have appropriate combinations of strength and water dispersibility. It is found that, the strength of the plug can be increased by making the paste to be alkaline. The strength of the plug made from the paste using the mixture of KCl and KOH as the inorganic binder is better than that of the plug made from the paste merely using KCl as the inorganic binder. Moreover, KOH itself also can be used as the inorganic binder, and plugs made from pastes using KOH as the inorganic binder also has acceptable strength and water dispersibility.

COMPARATIVE EXAMPLES

Four comparative examples were tested by replacing the beta-alumina in S4 of Example 2 with alpha-alumina ($\alpha$-$Al_2O_3$) or gamma-alumina ($\gamma$-$Al_2O_3$), or removing the sucrose or the inorganic binder from the composition of S5 in Example 1. The strength and dispersibility of plugs in the four comparative examples are listed in the following Table 5.

TABLE 5

Paste compositions and plug performance in comparative examples

| Comparative examples | Paste compositions | | | | | Plug performance |
|---|---|---|---|---|---|---|
| Comparative example 1 | $\alpha$-$Al_2O_3$ 8 g | $ZrSiO_4$ 2.5 g | $K_2HPO_4$ 3 g | sucrose 0.8 g | water 4 g | poor dispersibility |
| Comparative example 2 | $\gamma$-$Al_2O_3$ 8 g | $ZrSiO_4$ 2.5 g | $K_2HPO_4$ 3 g | sucrose 0.8 g | water 4 g | poor dispersibility |
| Comparative example 3 | $ZrO_2$ 8 g | $ZrSiO_4$ 4 g | $K_2HPO_4$ 2 g | sucrose 0 g | water 2 g | poor strength & poor dispersibility |
| Comparative example 4 | $ZrO_2$ 8 g | $ZrSiO_4$ 4 g | $K_2HPO_4$ 0 g | sucrose 0.5 g | water 2 g | poor strength & poor dispersibility |

As illustrated in Table 5, the plugs in comparative examples have poor dispersibility and are hard to be dispersed in water. The plugs in Comparative examples 3 and 4 also have poor strength.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method comprising:
   masking at least one hole of an article with a paste, wherein the hole opens onto a surface of the article;
   applying at least one coating to the surface of the article; and
   removing the paste comprising contacting the paste with water, leaving at least one open hole in the surface of the coated article,
   wherein the paste comprises:
      from about 40 weight percent to about 80 weight percent of a high temperature resistant filler material comprising:
         a first material including $\beta$-$Al_2O_3$; and
         a second material including zirconium silicate,
         the high temperature resistant filler material having a weight ratio between the first material and the second material in a range from about 1:1 to about 10:1;
      from about 0.5 weight percent to about 20 weight percent of an inorganic binder including a phosphate, a hydrogen phosphate, a pyrophosphate, a carbonate, a bicarbonate, a chloride, a hydroxide, or combinations thereof;
      from about 0.5 weight percent to about 15 weight percent of a polyhydroxy compound; and
      from about 5 weight percent to about 25 weight percent of water.

2. The method of claim 1, wherein the high temperature resistant filler material has an average particle size in a range from about 0.1 micron to about 100 microns.

3. The method of claim 1, wherein the first material further includes at least one of zirconium oxide or an alkali doped alumina other than $\beta$-$Al_2O_3$.

4. The method of claim 1, wherein the inorganic binder includes potassium hydrogen phosphate.

5. The method of claim 1, wherein the polyhydroxy compound comprises sugar.

6. The method of claim 1, wherein the weight percentage of the high temperature resistant filler material relative to the paste is in a range from about 60 weight percent to about 80 weight percent.

7. The method of claim 1, wherein the weight percentage of the inorganic binder relative to the paste is in a range from about 10 weight percent to about 20 weight percent.

8. The method of claim 1, wherein the weight percentage of the polyhydroxy compound relative to the paste is in a range from about 1 weight percent to about 5 weight percent.

9. The method of claim 1, wherein the weight percentage of water relative to the paste is in a range from about 10 weight percent to about 15 weight percent.

10. The method of claim 1, wherein the weight ratio between the first material and the second material is in a range from about 1 to about 8.

11. The method of claim 1, wherein the paste has a pH greater than 7.5.

12. The method of claim 1, further comprising, prior to the applying of the at least one coating, drying the paste.

13. A method for forming a plug which is used to mask a hole opening onto a surface of an article when a coating is applied to the surface of the article, the method comprising:
   forming a plug preform from a paste, the plug preform shaped in conformity with the hole, wherein the paste comprises:
      from about 40 weight percent to about 80 weight percent of a high temperature resistant filler material including:
         a first material including $\beta$-$Al_2O_3$; and
         a second material including zirconium silicate,
         the high temperature resistant filler material having a weight ratio between the first material and the second material in a range from about 1:1 to about 10:1;
      from about 0.5 weight percent to about 20 weight percent of an inorganic binder including a phosphate, a hydrogen phosphate, a pyrophosphate, a carbonate, a bicarbonate, a chloride, a hydroxide, or combinations thereof;

from about 0.5 weight percent to about 15 weight percent of a polyhydroxy compound; and from about 5 weight percent to about 25 weight percent of water; and drying the plug preform.

14. The method of claim 13, further comprising sintering the dried plug preform.

* * * * *